United States Patent Office 3,609,867
Patented Oct. 5, 1971

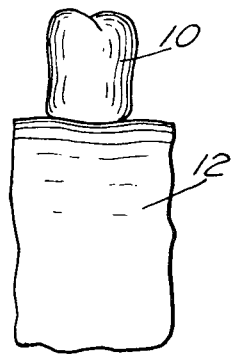
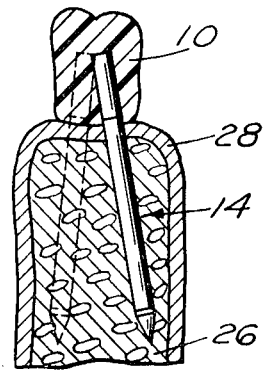
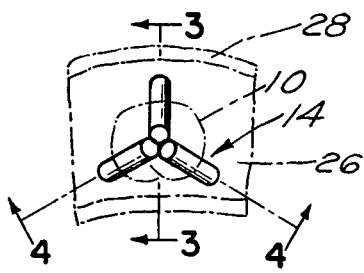
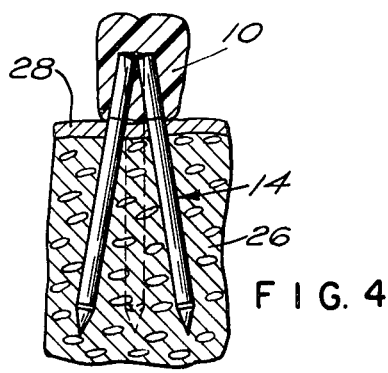
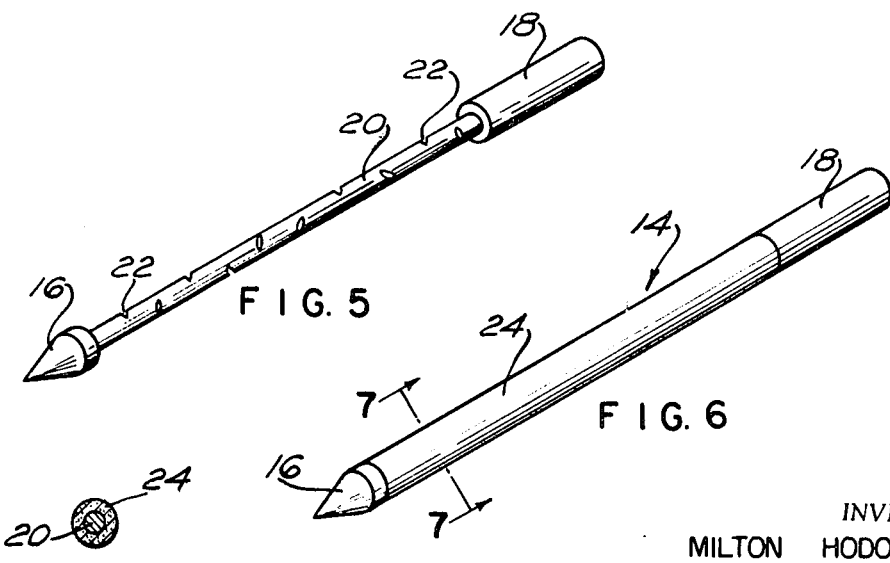

3,609,867
PLASTIC BONE COMPOSITION
Milton Hodosh, Providence, R.I., assignor to Research Corporation, New York, N.Y.
Filed Mar. 10, 1969, Ser. No. 805,400
Int. Cl. A61c 13/00
U.S. Cl. 32—10 A
2 Claims

ABSTRACT OF THE DISCLOSURE

A composition comprising as its basic ingredients a mixture of grated anorganic bone and an acrylic polymer, such as polymethacrylate, for use as dental implants, as well as for implants in other parts of the body, and as a coating for metals which may be implanted in the human body for dental purposes, orthopedic protheses, neurosurgery and others.

BACKGROUND OF THE INVENTION

It is well known in the dental art to utilize an acrylic polymer, such as polymethacrylate, for example, in the making of denture bases, and, also, artificial implants have heretofore been made of this material. These acrylic polymers have many characteristics that make them highly desirable for use as an artificial implant, which characteristics include the fact that this plastic material approaches a natural tooth in hardness and rigidity, is not adversely affected by the temperature conditions normally encountered in the human mouth, can be worked with facility to any desired shape, retains its color and composition, etc. Perhaps of even greater importance is the fact that it has been found that when an acrylic polymer is used for an artificial tooth replica implant a periodontal membrane forms around the base of the artificial implant much like that which exists around a natural tooth. This periodontal membrane is the structure that acts as a shock absorber, infection limiting mechanism and as a cellular reservoir, and the presence of such a membrane in an artificial implant is extremely important and desirable. It has been found that the membrane which forms about the acrylic polymer artificial implant distributes the forces exerted to the supporting tissues of the tooth in a near-natural manner.

One of the problems that has existed in connection with acrylic polymer dental implants is the fact that the fibrous interlock between the artificial implant and its periodontal membrane is not as deep and penetrating as that which exists with a natural tooth, nor is the pattern of interlock the same. The instant invention overcomes this deficiency and achieves a more effective interlock by more closely approaching the interlock which exists with a natural tooth, thus forming a more healthy periodontal membrane and a more firm and secure mounting of the artificial implant in the alveolar socket.

The instant invention also has utility in overcoming certain disadvantages that exist where metal implants are used in the human body. Metal implants have traditionally been used for dental purposes, as well as in the field of orthopedics and neurosurgery, and one of the problems that exist in such metal implants is the fact that metals have corrosive actions in the presence of living tissues resulting in electrolytic current being emitted which in turn reults in resorptive and destructive phenomena. It is, therefore, desirable to coat such metallic implants with the plastic bone composition of the instant invention since, once so coated, the implant is resistant to abrasion and corrosion and hence is non-conductive of the aforesaid electrolytic currents. In addition, the plastic bone coating results in a better fibrous interlock between the metallic implant and the surrounding bone in a biologically acceptable manner.

SUMMARY OF THE INVENTION

It is therefore a primary object of the instant invention to provide a composition of matter for use as an implant in the human body wherein the implant is biologically accepted by the surrounding tissues and interlocks therewith in a firm and natural manner.

A further object is the provision of a composition which may be used in the formation of an artificial dental implant, said composition being such that when the artificial implant is mounted in an alveolar socket, a periodontal membrane will form about the roots of the implant much like the membrane which exists around the roots of a natural tooth.

Another object is the provision of a plastic bone composition that may be used as a coating for metal implants.

Still another object is the provision of a plastic bone composition that is structurally strong but yet has sufficient porosity to enable implants or inserts of said composition in the human body to effectively interlock with surrounding bone and other tissues.

DESCRIPTION OF THE DRAWINGS

In the drawings which illustrate the best mode presently contemplated for carrying out the present invention:

FIG. 1 is an elevational view of an artificial tooth constructed and mounted in accordance with the instant invention;

FIG. 2 is a top plan view of the supporting struts;

FIG. 3 is a section taken on line 3—3 of FIG. 2;

FIG. 4 is a section taken on line 4—4 of FIG. 2;

FIG. 5 is a detailed perspective of one of the supporting struts prior to being coated;

FIG. 6 is a detailed perspective of the strut shown in FIG. 5 after coating; and FIG. 7 is a section taken on line 7—7 of FIG. 6.

DESCRIPTION OF THE INVENTION

In carrying out the aforestated objectives, a composition has been provided comprising as its basic ingredients a mixture of an acrylic polymer and an organic bone. The bone is gated or grounded to powder form and then mixed with the polymer, which may be either a heat process or quick-setting plastic. Any suitable bone may be used, although in practice it has been found that Boplant (registered trademark of Squibb) and Kiel Bone (trademark of Unilab Surgicals) have proven to be highly satisfactory. Boplant and Kiel Bone are sterile processed, bovine bone or cartilage commonly used for grafting procedures in orthopedic and reconstructive surgery. The plastic may be polymethacrylate, polymethylmethacrylate, or any other acrylic polymer having substantially the same characteristics.

The acrylic polymer in the above mixture imparts rigidity and strength to the composition, wherein its architectural shape is maintained; and, as previously mentioned, acrylic polymer, such as polymethacrylate, has substantially the strength, color, stability, and temperature characteristics exhibited by natural teeth which, of course, are of extreme importance when the instant composition is used as an artificial dental implant. On the other hand, the anorganic bone in the mixture is degrading and resorptive, thus imparting additional porosity to the composition. Thus, the composition becomes more porous as resorption of the bone takes place.

Since the composition of the instant invention has been developed for use as a dental implant and for implanting in other parts of the body as well, it is obviously important that the proper proportion of bone and plastic be employed in the mixture. To this end it has been found that when the bone comprises more than 30 percent by weight of the mixture, immunological rejection phenomenon begins to appear. When, however, less than 30 percent by weight of bone is in mixture, then the heterograft reaction that is found when bone from one animal is implanted into another animal is absent; and, accordingly, the composition of this invention comprises a maximum of 30 percent by weight of bone in the mixture. On the other hand, it is desirable that there be sufficient bone in the mixture so that the desired porosity will exist in the composition, and, hence, it has been found that a mixture comprising 20 percent to 22 percent by weight of bone and 78 percent to 80 percent by weight of acrylic polymer provides the best results.

Additional porosity may be obtained by the use of foaming agents in the mixture, not to exceed 10 percent of the mixture by weight. It has also been found that where the composition is to be used as a dental implant, favorable results may be obtained by including in the mixture a quantity of grated natural tooth, taken from the root of the tooth so that no enamel will be present. Specifically, it has been found that a mixture comprising approximately 20 percent by weight of grated natural tooth, approximately 20 percent anorganic bone and approximately 60 percent acrylic polymer provides good results. Here again a foaming agent may be added to the mixture if additional porosity is desired or required. Any variance in the percentage of natural tooth present in the mixture should be compensated for by a proportionate variance in the percentage of polymer.

The compositons above described have the quality of enabling connective tissue fibers to penetrate and form an actual network within its structure, thus bonding or uniting to its host in a biologically acceptable manner. As previously stated, it is the resorption of the bone in the mixture that creates the porosity that permits the aforesaid fibrous interlock to take place.

When these compositions are used as an artificial dental implant, the tooth replica implant is placed in the existing alveolar socket as soon after extraction of the natural tooth as possible. As previously stated, an artificial dental implant constructed of my composition has the highly desirable feature of forming a periodontal membrane much like that which exists with a natural tooth. It should be noted, however, that this composition is not limited to use as a dental implant but rather may be used as a substitute for human tissue whenever necessary and desirable, such as to fill defects or holes in the brain, skull or the like. Expressed differently, my composition may be used as a replacement for depleted bone throughout the body, such as in cranial plastics and cysts. In addition, this composition is highly desirable for use as a coating material for metals that are used throughout the body for orthopedic prosthesis.

Referring to the drawings, there is shown in FIGS. 1–4 an artificial tooth crown 10 and mounted in the gum 12 by means of metallic pins or struts shown generally at 14. As will be seen most clearly in FIGS. 5–7, each pin 14 comprises an enlarged point at front end 16, an enlarged cylindrical rear end 18 and a reduced shaft portion 20 extending therebetween. The shaft portion 20 is provided with a plurality of notches 22 for promoting a stronger bond between the reduced shaft portion 20 and coating 24 which extends therearound. The coating 24 consists of the plastic bone composition of the instant invention, and it will be noted that the coating is substantially flush with enlarged portions 16 and 18. One of the desirable features of the plastic bone composition of the instant invention is the fact that it has the capacity and ability of bonding firmly to metals, although, as aforestated, the secureness of the bond is enhanced by the provision of the notches 22. The pin 14 may be of any desired metal, although when used as a dental implant, it has been found that vitallium is desirable and satisfactory. Also, it is possible to completely coat a pin similar to pin 14, in which event it would not be necessary to have reduced shaft portion 20.

As will be seen most clearly in FIGS. 2–4, three pins 14 are provided, said pins being inserted into specially provided bores in bone 26 so that non-coated portion 18 of the pins 14 is above the upper surface of the gingiva 28 and is embedded within the crown 10. The struts 14 diverge from crown 10 in a tripod arrangement so as to provide a firm mounting for the crown, although other supporting arrangements could obviously be used.

The presence of coating 24 is advantageous for a number of reasons. As previously stated, the porosity of the plastic bone composition which makes up the coating 24 results in a better fibrous interlock between the coating and the surrounding periodontal tissues. In addition, the presence of coating 24 prevents the usual corrosive action which takes place when metals are in the presence of living tissues. Thus, the presence of coating 24 prevents emission of microwaves of electrolytic current and the resorptive and destructive phenomenon which results therefrom. Also, the presence of coating 24 results in minimal inflammation and excellent gingival health.

Although the use of the instant invention as a coating for a metallic pin used for dental purposes has been illustrated and described, it will be understood that other metallic implants and inserts in the human body will likewise benefit from the presence of a coating of this plastic bone composition. Thus, digits and limbs may be made from a combination of metals having this plastic bone coating. These may surgically have ligamentous attachments, and movements may be effected by bioengineering aids.

What is claimed is:

1. A plastic bone composition comprising a maximum of 30 percent by weight of grated anorganic bone mixed with an acrylic polymer, in combination with a metal member, said composition being in the form of a coating covering said member, said member being a pin having an enlarged pointed front end, and enlarged cylindrical rear end, and a reduced shank portion extending therebetween, said coating surrounding said reduced shank portion, the outer surface of said coating being substantially flush with said enlarged front and rear ends.

2. The combination of claim 1 further characterized in that said member is provided with a plurality of notches on its surface to achieve better bonding with said coating.

References Cited

UNITED STATES PATENTS

| 2,210,424 | 8/1940 | Morrison | 32—10 A |
| 3,314,420 | 4/1967 | Smith et al. | 32—10 A |

ROBERT PESHOCK, Primary Examiner